Patented Apr. 2, 1946

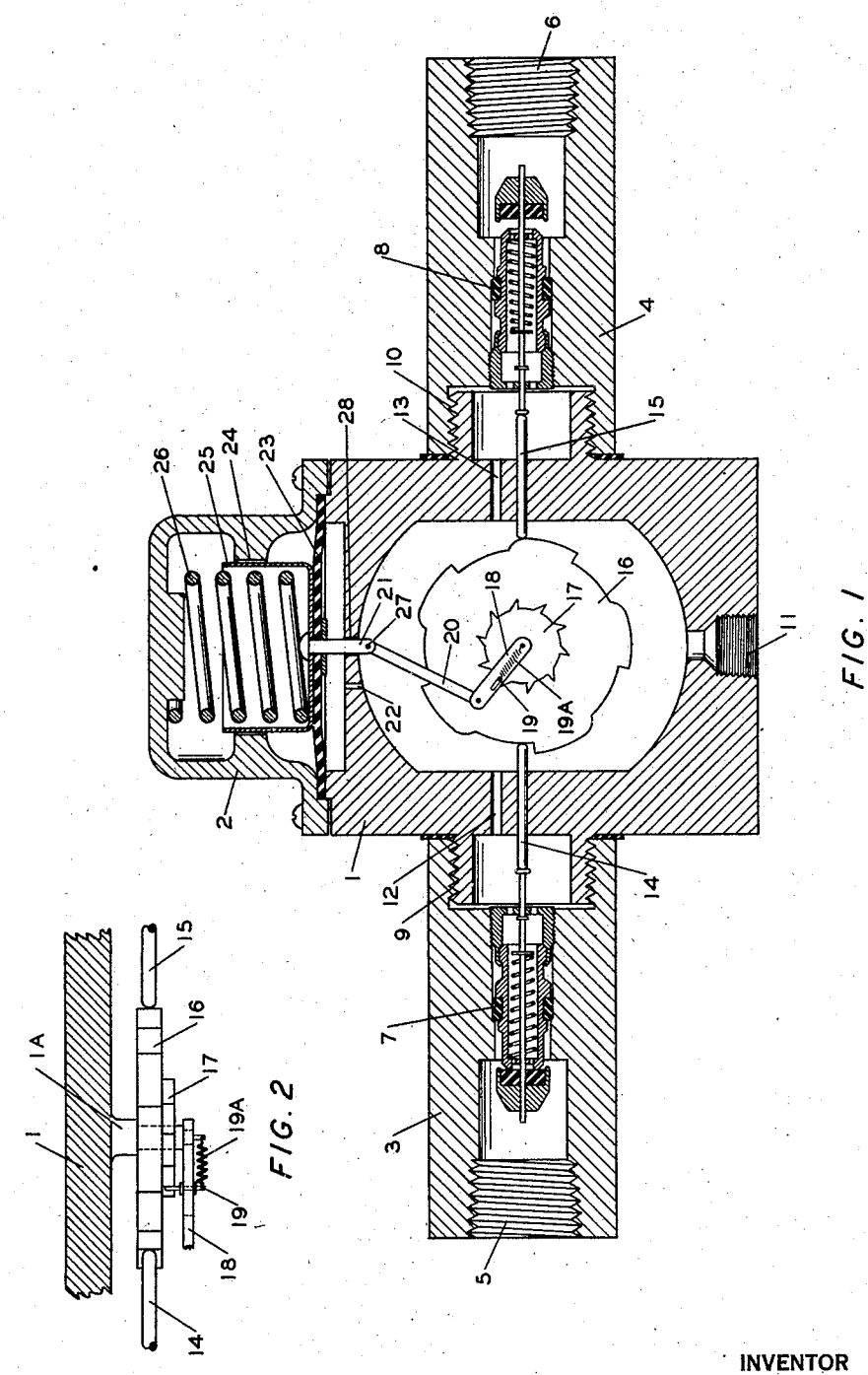

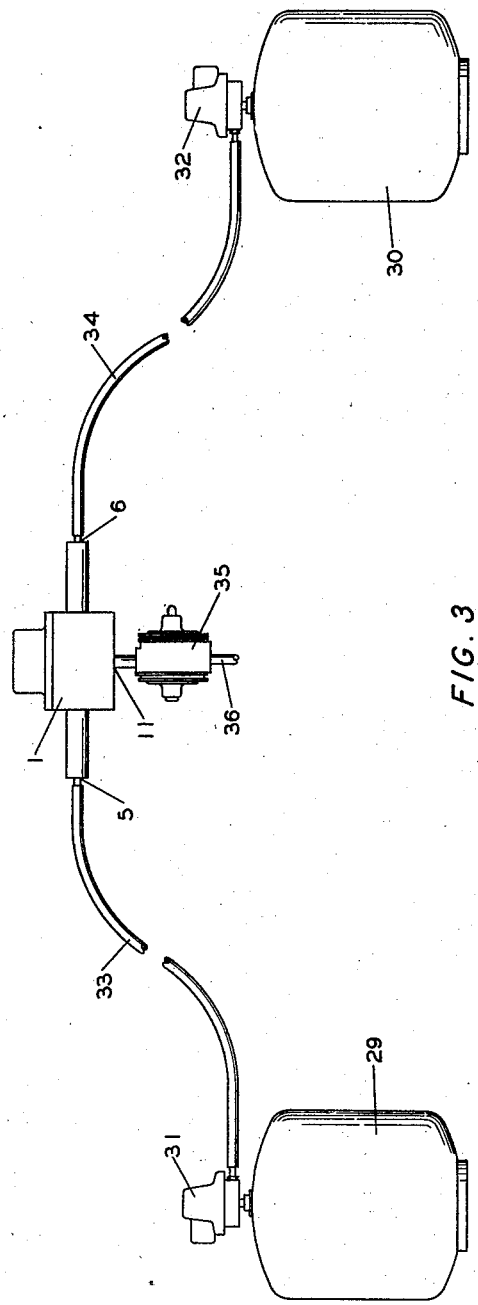

2,397,670

UNITED STATES PATENT OFFICE 2,397,670

CHANGE-OVER VALVE FOR GAS DISPENSING SYSTEMS

Allen D. Krugler, Bartlesville, Okla., assignor to Phillips Petroleum Company, a corporation of Delaware Application December 1, 1941, Serial No. 421,227

12 Claims. (Cl. 222—6)

The present invention relates to a fully automatic multiple cylinder gas system, wherein exhausted sources of supply are progressively disconnected and new ones connected as the conditions of use may require. In its simplest form, the device would provide for automatic selective withdrawal of fluid from the respective containers of a two-drum gas system. It could just as well, however, be used with three, four, or more containers of gas by properly locating an appropriate number of inlet valves in the device.

The primary object of my invention is to provide a fully automatic means of effecting selective withdrawal of fuel gas or other fluid from first one and then another similar source.

Another object of the present device is to provide for progressive withdrawal of fluid from more than two sources, whereas past devices have, by the nature of their construction, been necessarily limited to a maximum of two singular or plural sources.

A further object of this device is to avoid changing over of the supply connections due to a temporary minor fluctuation of pressures, or to any disparity of pressures in the respective supply containers.

The device further provides means to prevent escape of pressure through any disconnected station on the system, without the need for auxiliary back-flow check valve devices.

All of the above objects and advantages are realized by the use of a single pressure diaphragm and spring, which serve to index a multi-lobed cam with respect to the desired plurality of inlet valves, by means of an appropriate ratchet gear.

It is not the inventor's intention to limit the scope of his device to accommodate any specific number of containers or supply sources. Neither is it intended to limit the number of cam lobes used for any particular plurality of inlet valves, such as five lobes for two valves, as shown in the drawings. The number of lobes used for two valves, for example, can be varied to suit the desired diaphragm travel.

In the accompanying drawings:

Figure 1 is a vertical section through the changeover body. This view could be considered either as an elevation or a plan, since the device is not limited in operation to any particular position of mounting.

Figure 2 is a detail of a suggested embodiment of the cam, ratchet gear and pawl assembly as in Figure 1.

Figure 3 shows the assembly of Figure 1 as it might be incorporated in a two-drum gas system.

Referring to Figure 1, in which only two inlet stations have been shown for simplicity, numeral 1 is the main body of the assembly, and all other parts relate directly thereto. Valve housings 3 and 4 are fitted with threaded inlet connections 5 and 6, permitting ingress of fluid to valves 7 and 8. The threaded connections 9 and 10 are provided for convenience of assembly and for accessibility to the valves. The main body 1 is fitted with inlet channels 12 and 13 so that pressure may be admitted selectively from either side by opening of valve 7 or valve 8, respectively, and a common outlet 11 is provided. Within the housing 1 is contained a rotatably mounted cam 16 having one or more lobes, depending upon the number of valves to be actuated and upon the amount of diaphragm travel allowable in the case of any specific design. The valves 7 and 8 are rendered responsive to the cam 16 by means of the thrust members 14 and 15. The rotary advancement of the cam is brought about by oscillatory motion of the diaphragm 23 and the spring 26, which respond to pressure transmitted through the restricted channel 22. The linkage members 18 and 20, in cooperation with the ratchet pawl 19, serve to transform the linear motion of the diaphragm into angular motion in the cam. The spring 26 is guided by virtue of the sleeve 25, operating within the confines of the annular projection 24 in the spring housing 2. The diaphragm 23 is secured by means of the compression which is imposed annularly upon it by the flange-bolt attachment of the housing 2 to the main body 1. In the form shown by Figure 1, upward motion of the diaphragm is limited by the fact that the pivot pin 27 will bear upon the interior of the body 1 at the point where thrust member 21 passes through the guide hole 28. The downward travel of the diaphragm is likewise limited by virtue of its proximity to the upper wall of the main body 1.

Referring to Figure 2, which is an enlarged detail of the cam, ratchet and related parts 1A is a boss or fixed shaft projection which may be either integral with or securely attached to the main body 1, interiorly. The cam 16 and the ratchet sprocket 17 are free to rotate on the shaft thus formed, but both parts always rotate as a unit, being fastened together by any convenient means which will prevent them from moving with respect to each other. The arm 18, however, may move in one direction relative to the cam, but not in the other. Referring to the orientation of Figure 1, then, the arm 18 may rotate alternately in the clockwise and counter-clockwise directions. The cam, however, will always rotate in the clockwise direction, due to the cooperation and engagement of the pawl 19, loaded by the spring 19A of Figure 2.

Figure 3 shows the present invention diagrammatically as it would be used in a two-drum gas dispensing system, in which 29 and 30 represent two high pressure fuel containers, with primary pressure regulators 31 and 32 connected thereto, preferably of the type disclosed in my application Serial No. 401,849, filed July 10, 1941, which indicate the occurrence of a changeover. Flexible hoses 33 and 34 lead into the inlet connections 5 and 6 of the changeover valve body 1. At the outlet 11 may be installed a second stage pressure regulator 35, if desired, or service line 36 may be connected directly to the outlet 11, depending upon the requirements of the contemplated usage. Likewise, the primary regulators 31 and 32 may be omitted, if desired, since the changeover valve system will operate on either high or low pressure.

Having described the mechanical construction of my device in detail, I will now explain the manner of its operation. Upon initial installation of the device in a gas dispensing system, a container of gas would first be connected to the inlets 5 and 6 by means of suitable hoses or tubing, as shown in Figure 3. With the mechanism disposed as shown in Figure 1, gas would not enter through the left-hand valve 7 since it is in the closed position. The right-hand valve, however, would admit gas under pressure to the interior of the main body 1. From this enclosure, pressure would gain access to the underside of the diaphragm through the communicating channel 22, resulting in elevation of the diaphragm to its uppermost limit and compressing the spring 26. Simultaneously, the linkage composed of members 18, 20 and 21 is so motivated as to cause the pawl 19 to recede clockwise by the amount of one tooth on the ratchet gear or sprocket, thereby cocking the actuating mechanism. The cam does not move, however, since it is engaged by the pin 14, and is free on its shaft with respect to clockwise motion of the linkage arm 18. Meanwhile, gas may be withdrawn through outlet 11, from whence it proceeds to the point of utilization, being under control of the user at that point. Upon extended usage of gas from the right-hand source of supply, there will come a time when that source is depleted, resulting in a substantial lowering or complete failure of pressure. This failure of pressure will results in reduction of the total upward force imposed on the diaphragm, thus permitting the spring 26 to extend. The energy which was stored in the spring upon compression is thus now expended in driving the arm 18 in a counter-clockwise direction. In this case, the cam 16 is also rotated counter-clockwise, because of the engagement of the pawl 19 in a tooth of the ratchet gear 17. The length of the downward stroke is so regulated, by the mechanical limitation imposed on the diaphragm travel, that the cam will be advanced one step or cycle. In other words, the thrust pin 14 will now rest on the high portion of the nearest cam lobe, while pin 15 will slide toward the left in contact with a low portion of the cam. In this manner, valve 7 is opened and valve 8 is closed. Pressure is now free to enter the chamber enclosed by the body 1 from the left-hand supply source. This pressure bleeds slowly into the diaphragm chamber through the restricted passage 22 so as to permit the diaphragm to complete its downward stroke before the newly admitted pressure can act to raise the diaphragm again. As the diaphragm now slowly rises, the pawl slowly recedes one notch on the ratchet, indexing the device in readiness for the next cycle of operation, which will occur when the second source of supply is exhausted, the previous source having been replenished meanwhile.

It will be apparent from Figure 1 that the cam element can rotate only in one direction, since one of the thrust pins, as 14 for example, will always be so located that due to the configuration of the cam lobes, a locking or latching effect is obtained.

It is also to be noted that considerable period of dwell is provided in the cam lobes, so that minor pressure fluctuations which may cause the cam to creep in the advance direction to some extent will not result in premature cycling of the valves.

It is to be understood that this invention is by no means to be restricted to the particular configuration shown in Figure 1. The principle of operation employed lends itself well to many variations as to number of inlets or sources handled. Further, the arrangement of valves in the case of a two-station system is subject to variation without departing from the principle illustrated. For example, by rearranging the location of the valves so that they were not diametrically opposite, an even number of cam lobes could be employed such as four or six. By properly locating the valves, furthermore, two or more sets of valves could be operated, using two or more cams on a common shaft. A means of indication of the status of the supply cylinders could be incorporated in the system by installing a pressure-operated semaphore device or a pressure gauge at any desired point in the fuel conduits leading from the cylinders to the changeover valve. I much prefer, however, to employ the semaphore type primary regulators disclosed in my aforementioned application which absolutely avoid confusion on the part of the customer. A positive indication of exhaustion is thus provided on each cylinder.

I claim:

1. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, valve actuating means comprising a rotatable cam member having alternate ridges and depressed portions on the circumference thereof, said valve actuating means being disposed to open each of said valves in order and to hold open only one of said valves at a time by means of said ridges, and fluid pressure operated means automatically responsive every time there is a predetermined rise and fall of pressure in said chamber and automatically actuating said valve actuating means to open the next valve in said order of opening.

2. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, a flexible diaphragm having one side exposed to the pressure in said chamber, a spring urging said diaphragm inwardly against said pressure, valve actuating means to open one of said valves at a time, the pressure in the chamber forcing the diaphragm outwardly to a first position, connecting means between the diaphragm and actuating means comprising a ratchet gear on the valve actuating means, a crank rotatable about the axis of the ratchet gear, a pawl on the crank engaging the ratchet gear for drive in one direction and a pitman connecting the crank and the diaphragm, said connecting means being disposed to connect said diaphragm in said first position to said valve actuating means and upon exhaustion of the pressure in the chamber below a predetermined point and resulting inward movement of the diaphragm to drive the valve actuating means to open another one of said valves.

3. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, valve actuating means disposed to open each of said valves in order and to hold open only one of said valves at a time, and fluid pressure operated means automatically responsive every time there is a predetermined rise and fall of pressure in said chamber and automatically actuating said valve actuating means to open the next valve in said order of opening.

4. An automatic fluid actuated dispensing unit comprising in combination a body having a chamber therein, at least three separate conduits in the body, each conduit connecting the chamber to a separate fluid line, there being at least a first valve controlling flow in a first one of said conduits and a second valve controlling flow in at least a second one of said conduits, a diaphragm disposed to move from a first outward position to a second inward position with respect to the chamber responsive to a predetermined change of pressure in said chamber, valve actuating means driven by said diaphragm moving under said pressure change disposed to open each of said valves in order and to hold open only one of said valves at a time automatically each and every time the diaphragm travels from said first position to said second position.

5. A control valve comprising in combination a body having a chamber, said body having three separate conduits communicating with said chamber, a flexible diaphragm forming a wall of said chamber, spring means urging said diaphragm toward said chamber, a cam mounted for rotation in said chamber about an axis of rotation, alternate portions of the periphery of said cam extending different radial distances from said axis of rotation, a ratchet wheel secured for rotation with said cam, a crank arm rotatable about said axis of rotation, a pawl on said crank engaging said ratchet wheel for drive in one direction, a pitman connecting the crank and the diaphragm, a first valve controlling flow in a first one of said conduits, a second valve controlling flow in a second one of said conduits, spring means urging each of said first and second valves closed, and valve actuating means disposed to engage each of said first and second valves and disposed to be engaged by the periphery of said cam so that one valve is open and the other valve is closed whereby every time a predetermined rise in pressure is followed by a predetermined fall in pressure in said chamber, said first and second valves are automatically reversed as to their being open or closed by the resulting movement of said diaphragm and cam.

6. A control valve comprising in combination a body having a chamber, said body having three separate conduits communicating with said chamber, a flexible diaphragm forming a wall of said chamber, spring means urging said diaphragm toward said chamber, a cam mounted for rotation in said chamber about an axis of rotation, alternate portions of the periphery of said cam extending different radial distances from said axis of rotation, a crank arm rotatable about said axis of rotation, drive means actuated by said crank engaging said cam for drive in one direction, means connecting the crank and the diaphragm, a first valve controlling flow in a first one of said conduits, a second valve controlling flow in a second one of said conduits, means urging each of said first and second valves closed, and valve actuating means associated with each of said first and second valves and disposed to be engaged by the periphery of said cam so that one valve is open and the other valve is closed whereby every time a predetermined rise in pressure is followed by a predetermined fall in pressure in said chamber, said first and second valves are automatically reversed as to their being open or closed by the resulting movement of said diaphragm and cam.

7. A control valve comprising in combination a body having a chamber, said body having three separate conduits communicating with said chamber, a flexible diaphragm forming a wall of said chamber, means urging said diaphragm toward said chamber, a cam mounted for rotation in said chamber about an axis of rotation, alternate portions of the periphery of said cam extending different radial distances from said axis of rotation, drive means connecting said diaphragm and said cam converting reciprocating movement of said diaphragm to rotary movement of said cam, a first valve controlling flow in a first one of said conduits, a second valve controlling flow in a second one of said conduits, and valve actuating means associated with each of said first and second valves and disposed to be engaged by the periphery of said cam so that one valve is open and the other valve is closed whereby every time a predetermined rise in pressure is followed by a predetermined fall in pressure in said chamber, said first and second valves are automatically reversed as to their being open or closed by the resulting movement of said diaphragm and cam.

8. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, valve actuating means comprising a rotatable cam member having alternate ridges and depressed portions on the circumference thereof, said valve actuating means being disposed to open each of said valves in order and to hold open only one of said valves at a time by means of said ridges, and fluid pressure operated means automatically responsive every time there is a predetermined rise and fall of pressure in said chamber and automatically actuating said valve actuating means to open the next valve in said order of opening, said valve actuating means comprising said cam rotatable about an axis for engaging said valve means, said cam having a ratchet gear concentric with said axis, and in which the fluid pressure operated means comprises a crank arm rotatable about said axis, a pawl on the crank engaging the ratchet for movement in only one direction of rotation, a flexible diaphragm mounted on said body moving in response to said rise and fall of pressure in said chamber, a spring urging said diaphragm against the pressure in said chamber and a pitman connecting said crank and said diaphragm.

9. An automatic fluid actuated dispensing unit comprising in combination a body having a chamber therein, at least three separate conduits in the body each conduit connecting the chamber to a separate fluid line, there being at least a first valve controlling flow in a first one of said conduits and second valve controlling flow in a second one of said conduits, valve actuating means disposed to open each of said valves in order and to hold open only one of said valves at a time, and fluid pressure operated means automatically responsive every time there is a predetermined rise and fall of pressure in said chamber and automatically actuating said valve actuating means to open the next valve in said order of opening, in which the fluid pressure operated means comprises a flexible diaphragm mounted on said body moving in response to said rise and fall of pressure in said chamber.

10. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, valve actuating means disposed to open each of said valves in order and to hold open only one of said valves at a time, and fluid pressure operated means automatically responsive every time there is a predetermined rise and fall of pressure in said chamber and automatically actuating said valve actuating means to open the next valve in said order of opening, in which the fluid pressure operated means comprises a flexible diaphragm mounted on said body moving in response to said rise and fall of pressure in said chamber, and a spring urging said diaphragm against the pressure in said chamber.

11. A control valve comprising means for coupling a supply line to two exhaustible and replaceable sources of gas supply; valve actuating means for automatically closing said valve to one of said sources of supply each time said valve actuating means is actuated, and motor means coupled to said valve actuating means for driving said valve actuating means to close said valve to the source it is open to upon the pressure in said supply line falling to a predetermined point comprising a diaphragm responsive to said pressure in said supply line and a spring means receiving energy from said diaphragm and being compressed by each source of gas supply as it is coupled to the supply line, the spring means storing energy to furnish the force for actuating the valve actuating means each time the pressure in said supply line falls to said predetermined point.

12. An automatic fluid actuated dispensing unit comprising in combination a body having a chamber therein, at least three separate conduits in the body each conduit connecting the chamber to a separate fluid line, there being at least a first valve controlling flow in a first one of said conduits and a second valve controlling flow in a second one of said conduits, valve actuating means comprising a cam rotatable about an axis in said chamber and having alternate ridges and depressed portions on the circumference thereof, said cam having a ratchet gear concentric with said axis, said valve actuating means being disposed to open each of said valves in order and to hold open only one of said valves at a time by means of said ridges, and fluid pressure operated means comprising a crank arm rotatable about said axis, a pawl on the crank engaging the ratchet for movement in only one direction of rotation, a flexible diaphragm mounted on said body moving in response to said rise and fall of pressure in said chamber, a spring urging said diaphragm against the pressure in said chamber and a pitman connecting said crank and said diaphragm, said fluid pressure operated means automatically responsive every time there is a predetermined rise and fall of pressure in said chamber and automatically actuating said valve actuating means to open the next valve in said order of opening.

ALLEN D. KRUGLER.